United States Patent [19]

Lund

[11] Patent Number: 4,649,614
[45] Date of Patent: Mar. 17, 1987

[54] METHOD AND APPARATUS FOR REPAIR OF FLANGED EXHAUST CONNECTIONS

[75] Inventor: John G. Lund, Tahoe City, Calif.

[73] Assignee: In-Mech Industries, Tahoe City, Calif.

[21] Appl. No.: 587,992

[22] Filed: Mar. 9, 1984

[51] Int. Cl.⁴ .................. B23P 19/04; F16L 55/18; F16L 23/00

[52] U.S. Cl. .................. 29/257; 29/157 R; 29/402.01; 24/493; 24/514; 138/97; 285/406; 403/338

[58] Field of Search ............... 29/157 R, 257, 402.01, 29/402.09, 402.14, 402.15; 285/364, 406, 420; 403/DIG. 4, 338; 24/493, 514; 138/97, 155

[56] References Cited

U.S. PATENT DOCUMENTS

| 101,927 | 4/1870 | Shaller | 285/406 |
| 303,075 | 8/1884 | Towne | 285/406 |
| 1,870,770 | 8/1932 | De Witt | 285/406 X |
| 2,478,487 | 8/1949 | Katzenmeyer et al. | 285/364 X |
| 2,881,805 | 4/1959 | Cobb | 285/364 X |
| 2,891,807 | 6/1959 | Auwarter | 285/364 X |
| 3,165,341 | 1/1965 | Burns et al. | 285/406 |
| 3,191,969 | 6/1965 | Wrenshall | 285/406 X |
| 3,642,307 | 2/1972 | Brickhouse et al. | 285/364 X |

FOREIGN PATENT DOCUMENTS

| 530876 | 8/1931 | Fed. Rep. of Germany | 285/364 |
| 1297826 | 5/1962 | France | 285/364 |
| 1457998 | 11/1966 | France | 285/364 |
| 62215 | 6/1968 | German Democratic Rep. | 285/364 |
| 445952 | 3/1968 | Switzerland | 285/364 |
| 448638 | 4/1968 | Switzerland | 285/364 |
| 38406 | of 1884 | United Kingdom | 285/364 |
| 177096 | 3/1922 | United Kingdom | 285/406 |
| 522602 | 6/1940 | United Kingdom | 285/364 |

OTHER PUBLICATIONS

Nayler, J. L. & Nayler G. H. F., Dictionary of Mechanical Engineering, George Newnes, Ltd. (London) (1967), at 224 (definition of a "lock nut").

Primary Examiner—Howard N. Goldberg
Assistant Examiner—Ronald S. Wallace
Attorney, Agent, or Firm—Herbert C. Schulze

[57] ABSTRACT

This invention is a method, together with an apparatus for practicing the method, wherein automotive exhaust systems, and the like, which become separated at their juncture to manifolds, or the like, by reason of breakage of fastening bolts, studs, and the like are repaired by the use of the apparatus consisting of clamping devices formed of a plurality of essentially "U" shaped frames with threaded elements in the legs of the "U" shaped frames which threaded elements engage adjacent areas of the separated exhaust system elements and draw them together by being moved through the threads into a clamping action.

1 Claim, 18 Drawing Figures

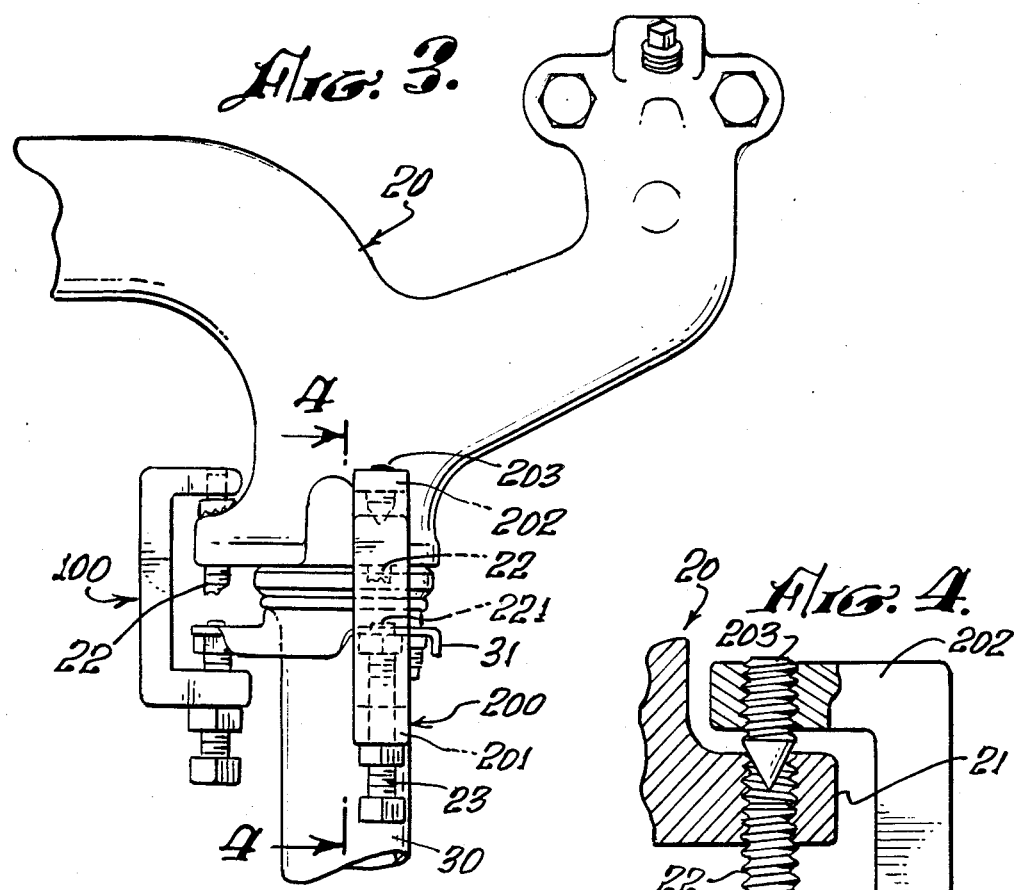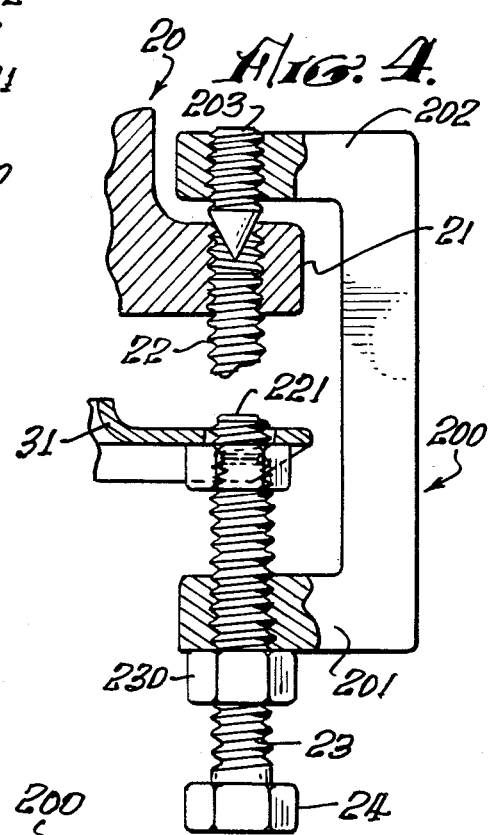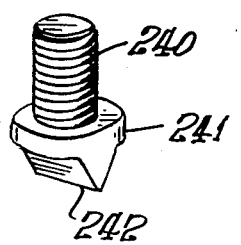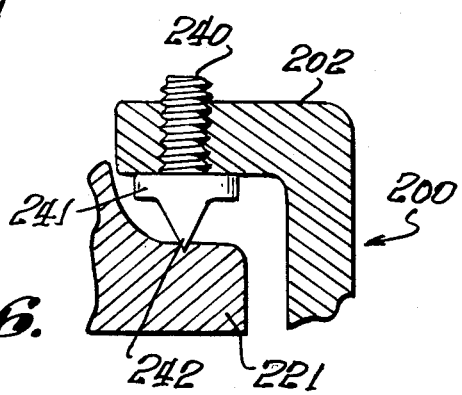

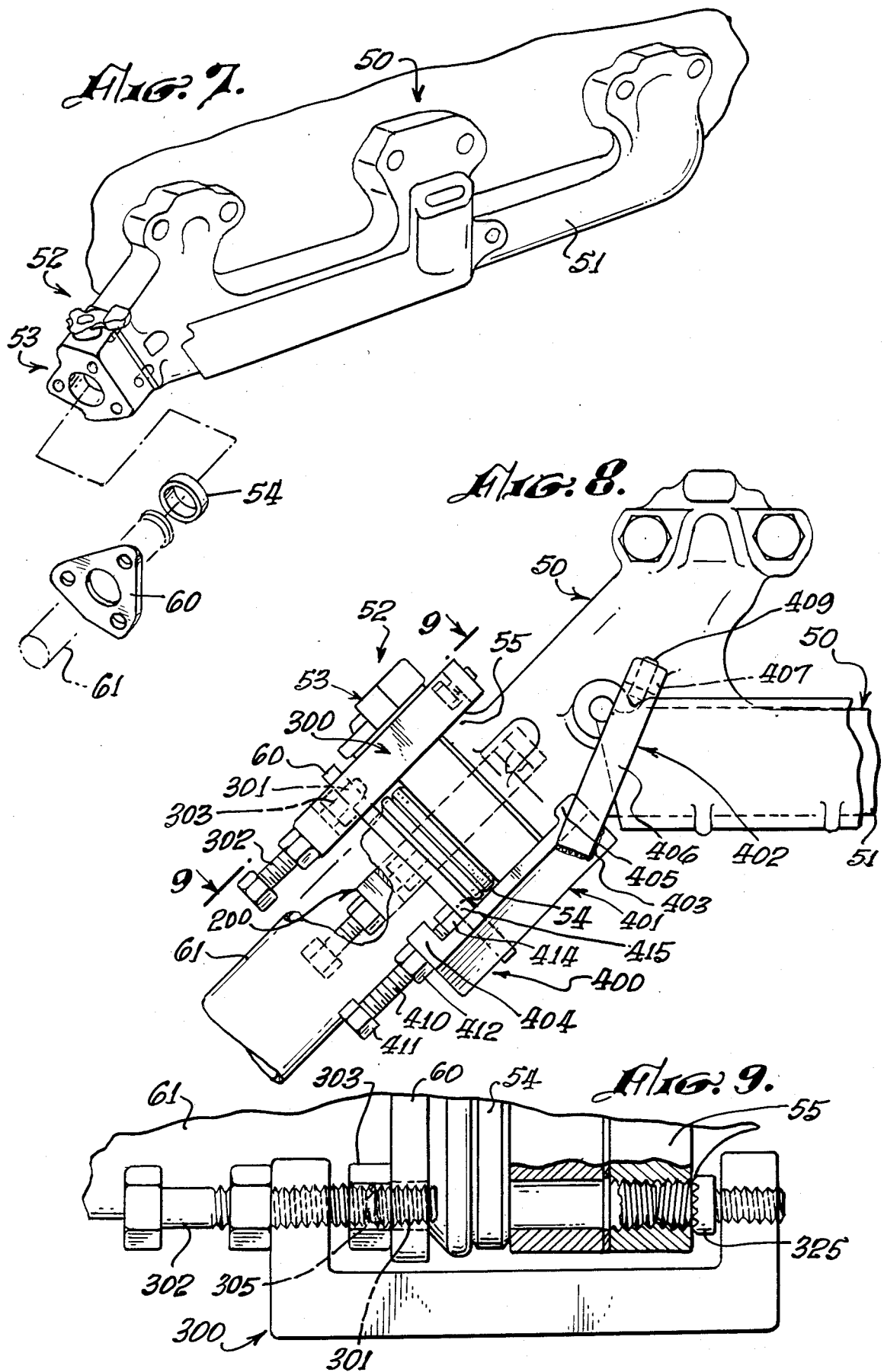

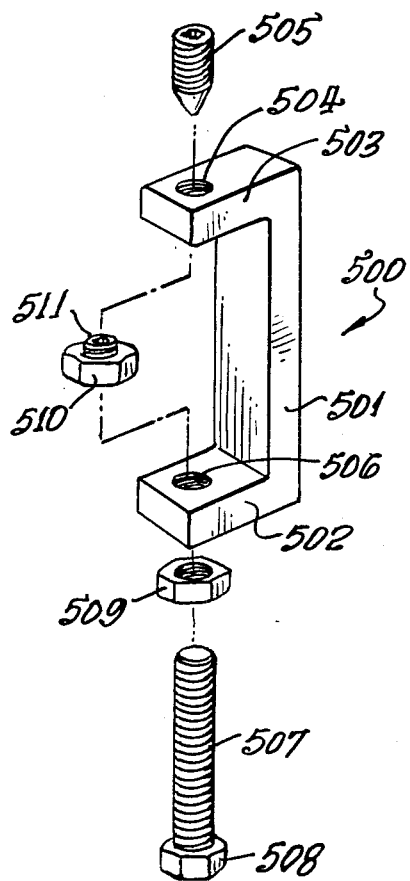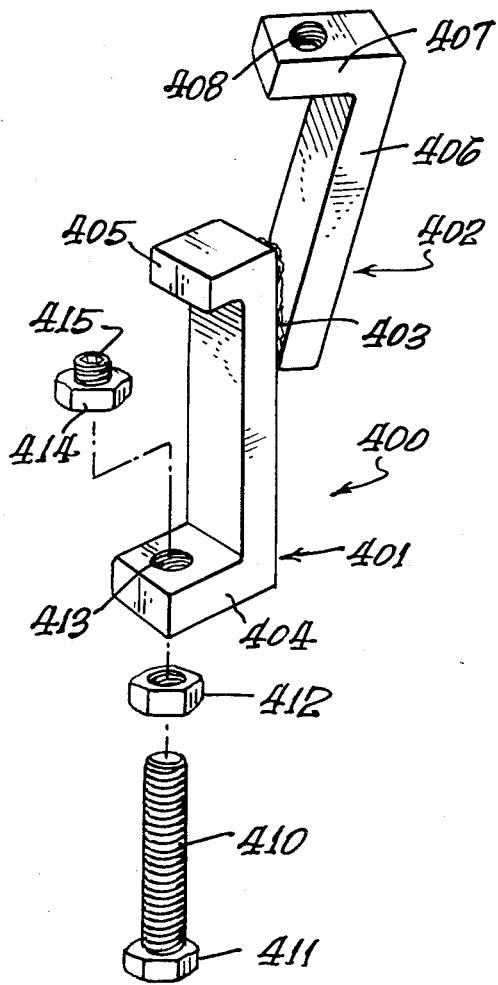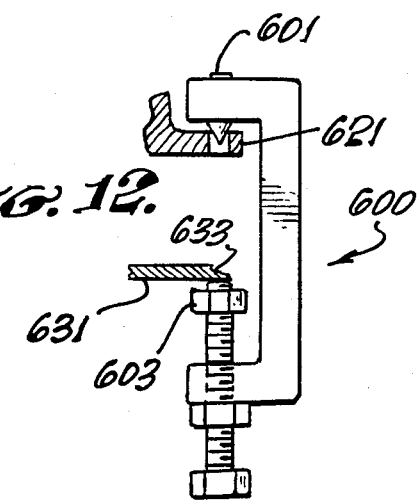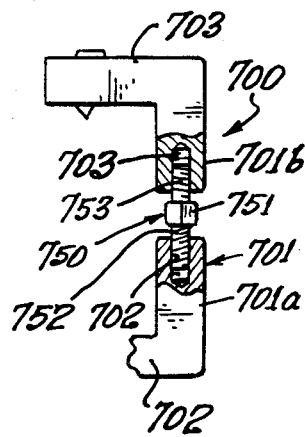

METHOD AND APPARATUS FOR REPAIR OF FLANGED EXHAUST CONNECTIONS

CROSS REFERENCE TO RELATED PATENT APPLICATIONS

There are no related patent applications filed by me related to this application except for design patent application entitled OFFSET CLAMP being filed concurrent herewith and which clamp is sometimes used in practicing the method of this invention.

BACKGROUND OF THE INVENTION

1. Field of the Invention

This invention is in the general field of automobile repair. The invention is even more particularly directed to the field of repair and replacement of automotive exhaust systems, and is still more specifically directed to a method for clamping flanged exhause systems, or the like, to manifolds, or the like, where normal connecting elements have become broken, or damaged, thus avoiding the necessity of disassembly of the various elements involved.

2. Description of the Prior Art

There is no art known to me utilizing the principles and apparatus of this invention. Customarily the prior art for repairing exhaust systems at their flanged connection to manifolds, and the like, utilizes the replacement of elements, frequently drilling out old broken bolts, and similar time consuming steps required to insert new bolts to connect the system to the manifold.

The present invention does not utilize the prior time consuming techniques, but utilizes a unique combination of positioning exhaust systems and the like to manifolds and the like permanently fastening the two together by the use of specially designed clamps and accessories, which are easily and quickly installed.

SUMMARY OF THE INVENTION

In the automotive, and other industries, there are constant requirements for repair and replacement of exhaust systems. Frequently, the bolts, or studs, or other connecting elements joining manifolds and exhaust systems by an appropriate flanged connection, or the like, may become broken in such manner that the exhaust system and the manifold to which it is normally connected must be removed in order to drill out, or retap, appropriately located bolts or stud holes, or to repair broken flange portions or other damaged connecting elements. Such procedure is difficult and time consuming and frequently results in causing the manifold or the exhaust system to become damaged beyond repair.

When such a condition occurs it may be necessary to place the vehicle out of service for extended periods of time when manifolds are not immediately available and may have to be specially ordered from the appropriate factory or the like. Additionally, when such condition occurs the automotive lifts utilized in changing or repairing mufflers or other repair activities may be tied up an inordinate amount of time resulting in uneconomic conditions for the repair agency, which requires the lifts to be in rather constant use for active work rather than becoming idle during extended periods for special repair on manifolds or the like.

Such problems occur with great frequency, however, and, on those occasions, the uneconomical utilization of repair equipment and the like results. Likewise, the immobility of the vehicle because of such condition may be quite intolerable.

I have studied this condition at length and have now conceived and developed a unique method and apparatus for repairing and reconnecting exhaust systems, or the like, to manifolds, or the like, without the necessity of removal of elements of the system, replacement of bolts in the cumbersome manner heretofore known, or the like.

I have accomplished this unique and highly desirable end result by conceiving and developing a system of specially adapted and specially formed clamping elements utilized in an unusual manner to successfully clamp the damaged connecting areas between the exhaust systems and the like and manifolds and the like, without tampering with or attempting to repair broken or damaged elements associated with their connections.

In my method as now set forth in this patent application, I examine the damaged connection area between an exhaust system and a manifold and analyze the type of special clamp arrangement required for each damaged element. Thereafter, I then appropriately place each clamp in such a manner that it cannot slip, after being tightened, from its connection to the exterior portions of the flanges or other joining points between the exhaust system or the like and the manifold or the like.

Detailed descriptions of the method of achieving these permanent repairs by this exterior clamping method will be found in connection with a study of the drawings and the description of a preferred embodiment which follows.

It is an object of this invention to provide a method for joining connections between exhaust systems and the like and manifolds and the like, which have been damaged, without the necessity of removing the elements from their existing positions in operation.

Another object of this invention is to provide such a method and apparatus as heretofore set forth wherein specially designed clamps are used to fasten the exterior of the joinder elements between exhaust systems or the like and manifolds or the like.

Another object of this invention is to provide such a method and apparatus as has been heretofore mentioned wherein damaged connecting elements between exhaust systems and the like and manifolds and the like need not be removed and repaired in order to effect permanent reconnection between damaged connecting elements of such systems.

Another object of this invention is to provide such a method and apparatus as heretofore been described, wherein the manifold and exhaust system are placed in proper alignment with one another and held in such proper alignment with one another by the use of the special clamping methods and apparatus described herein.

The foregoing and other objects and advantages of this invention will become apparent to those skilled in the art upon reading the description of a preferred embodiment which follows, in conjunction with a review of the appended drawings.

BRIEF DESCRIPTION OF THE DRAWINGS

FIG. 3 is a side elevation of a portion of a manifold and exhaust system at the connection between the two showing a damaged original connection and apparatus embodying the method of this invention overcoming such damage;

FIG. 4 is an enlarged partial section on 4—4 of FIG. 3;

FIG. 5 illustrates a specially designed clamp element for use in practicing the method of this invention;

FIG. 6 is a partially sectioned view of a portion of a manifold flanged area and a clamp for utilizing the method of this invention wherein the apparatus of FIG. 5 is being particularly used;

FIG. 7 is a schematic perspective of an exhaust manifold and exhaust system connection removed;

FIG. 8 is an enlarged elevational view of a connecting area such as that at the left edge of FIG. 7 with the elements assembled and certain elements added showing the use of the apparatus and method of this invention for effecting the juncture;

FIG. 9 is an enlarged partially sectioned view on 9—9 of FIG. 8;

FIG. 10 is an exploded view of a clamp utilized in practicing the method of this invention;

FIG. 11 is an exploded view of another clamp utilized in practicing the method of this invention;

FIG. 12 is a schematic, partially sectioned, and partially broken away view of the clamp of FIG. 10 in use;

FIG. 13 is a partially broken away, partially sectioned, elevational view of a clamp having certain additional adjustable features to be used in practicing the method of this invention;

DESCRIPTION OF A PREFERRED EMBODIMENT

Figure 1:
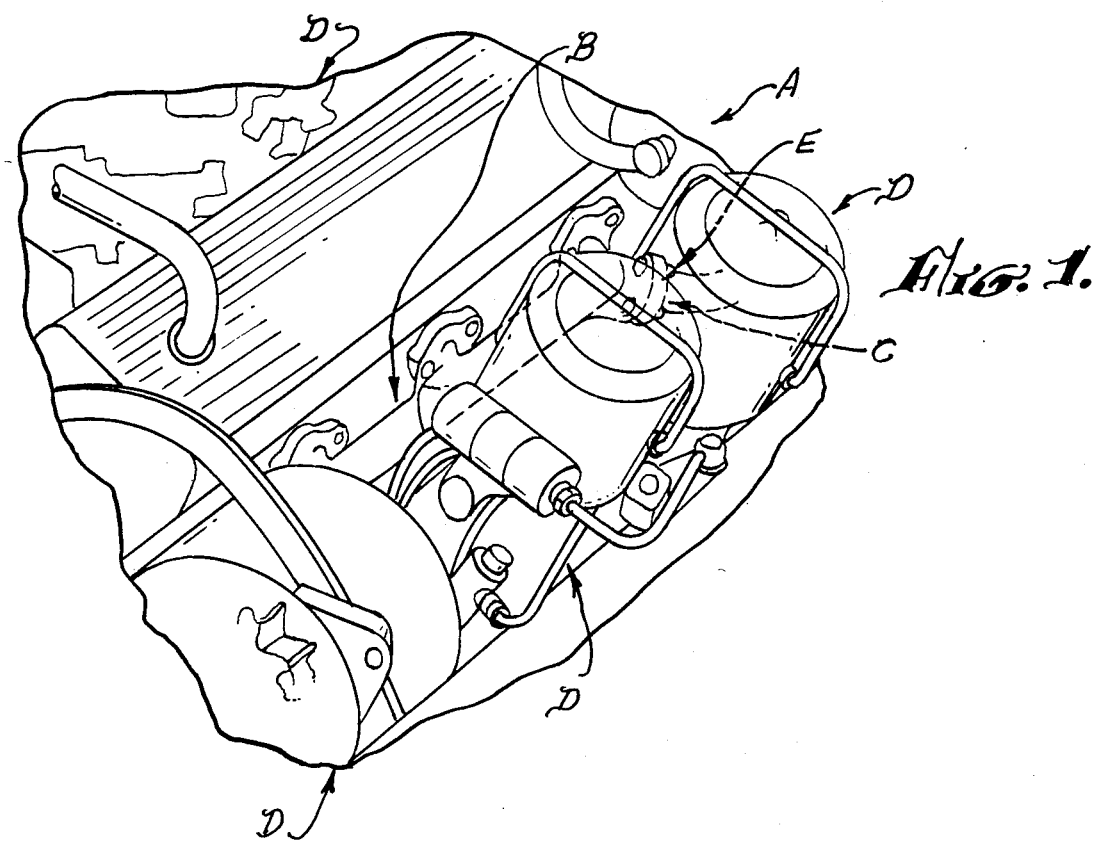
FIG. 1 is a partially broken away schematic perspective of certain elements of a vehicular engine primarily for purposes of illustration of the inaccessability of the connection between the manifold and exhaust system for repair in the past.
Figure 2:
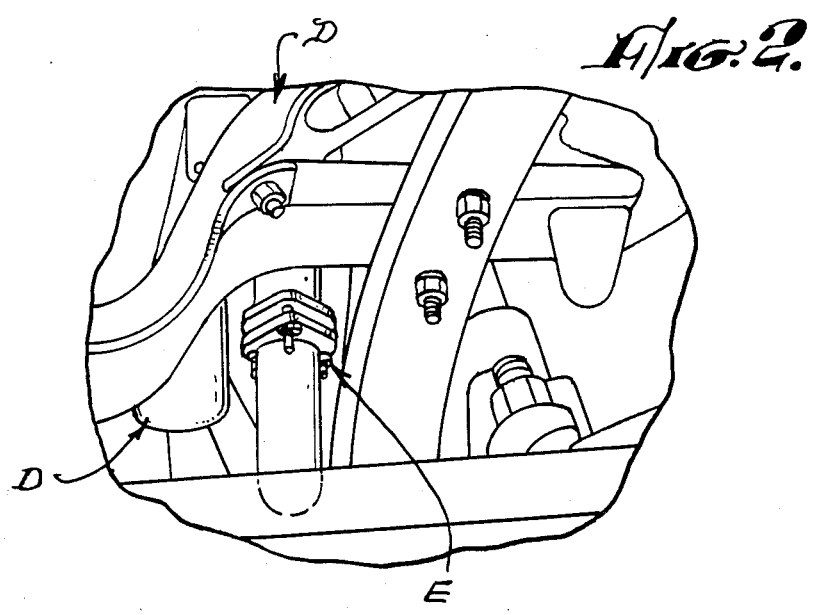
FIG. 2 is a partially broken away schematic perspective representation of a portion of FIG. 1 from the underside not visable from the top view as shown in FIG. 1.

FIGS. 1 and 2 are merely for the purposes of illustrating in general the complex situation, particularly in automotive vehicles, presented when it is attempted to repair a damaged connection between an exhaust system and the manifold to which it is connected. The automotive engine generally A is seen to include a manifold B and an exhaust system connection at E initially connecting to the exhaust system C. Numerous customary engine obstructions exist, as well as frame and other obstructions, as is known to mechanics who work regularly on automotive type engines. For example, the letter D has been shown several times to illustrate such elements as oil filters and numerous other portions of the vehicle known to those skilled in the art which prevent easy access to the connecting areas E.

In FIG. 3 there is illustrated a portion of a manifold 20, the initial exhaust system portion 30, a flanged exhaust system portion 31, and the manifold connecting flange area 21. Broken bolts or the like previously connecting the exhaust system to the manifold are shown at 22.

Under ordinary circumstances in the illustration of FIG. 3 it would have been necessary to totally disassemble the unit, remove the broken bolts, possibly drill and tap new holes and possibly even to obtain a replacement manifold or total exhaust system.

However, in the example of FIG. 3, by the use of this special method, I have used two special clamps generally 100 and 200 to bring the elements together so that there is no necessity for complete disassembly or replacement of units. The exact clamp 100 illustrated in use in FIG. 3 is shown in greater detail and enlarged in FIG. 14. The clamp 200 is shown in greater detail in FIG. 4. FIG. 4 is a partial section on FIG. 3.

Looking at FIG. 3 and FIG. 4 together it is seen that the manifold 20 with its flange 21 and broken bolt 22 is being held to exhaust system flange 31 without the use of a new bolt by means of the clamp 200. Clamp portion 202 is shown to have a threaded hole with a threaded and pointed set screw 203. This enters into the old hole and/or the old bolt 22 and is clamped in position by means of threaded bolt member 23 through an appropriate threaded opening in clamp portion 201 connected as shown by a means of nut 220 and set screw 221 which hold the nut in locked position and against turning and against the face of exhaust flange 31. The nut 230 is used as a lock nut to lock the clamp in position in a manner known to those skilled in the art when appropriate tension has been applied. Tension will be applied through a customary head or the like 24 on bolt 23. In practice it has taken only a few moments to set up the clamp and attach it as indicated and bring it to the proper tension in cooperation with any pre-existing and still usable original bolt or stud connections and/or in cooperation with additional clamps such as clamp 100 which is shown in FIG. 3 and will be described in greater detail in connection with FIG. 14.

FIG. 5 illustrates a special attachment comprising a threaded stud like element 240 having an enlarged end 241 with the chisel shaped terminal end 242. Such an apparatus can be used in place of set screw 203 in clamp 200 or in similar situations and if there is no appropriate opening for a pointed set screw as shown in FIG. 4, the element illustrated in FIG. 5 will be used as shown in FIG. 6. In this case, the manifold flange (221) similar to manifold flange 21 will be gripped by the chisel edge 242 biting into the surface as shown in FIG. 6. Otherwise, the clamp will act in the manner as shown in FIG. 4.

FIG. 7 has been inserted merely as a general illustration of a problem sometimes encountered in this type operation. FIG. 8 may be viewed in connection with FIG. 7 and it will be noted that the elements of FIG. 8 are enlarged, and slightly changed to show more detail, it being kept in mind that FIG. 7 is only for schematic purposes to show the problem. FIG. 7 shows an engine block 50 with its exhaust manifold 51 and possibly a heat valve or the like 53 all at the general connecting area 52. A gasket or the like 54 may be necessary in connection with the flange connection 60 and exhaust conduit 61.

In FIG. 8 there is shown more detail of the workings of this unique method and apparatus in joining together a previously damaged area such as shown schematically in FIG. 7. The clamp 300 shown in FIG. 8 is virtually identical to clamp 100 shown in FIG. 1. However, as noted particularly in FIG. 9, this clamp is utilizing slightly different gripping arrangements. The gripping arrangement at the lower end of this clamp 300 is shown to comprise a bolt 302 joining against a set screw 301 within the nut 303 at juncture position 305. The set screw against the bolt at juncture position 305 prevents rotation within the nut 303 which now becomes an abutment against the exhaust flange 60. On the other end, the gripping member 325 comprising a member similar in structure to that shown in FIG. 17, but having a straight rather than inclined deck, will be utilized as shown to clamp against the manifold clamping area 55.

Referring back to FIG. 8 another clamp, 400, is shown. Such a clamp as 400 is shown in position with a lower portion against the exhaust flange 60 and upper portion against an abutment area on the exhaust manifold 50. This clamp will be thoroughly understood in connection with the description of FIG. 11 below, since FIG. 11 is a detailed exploded view of the clamp such as 400, used to clamp around difficult areas where an exact connection to a flange cannot be made.

FIG. 10 illustrates the general structure of a general duty clamp for performing the method of this invention. It will be noted that there is considerable similarity to this clamp and to clamps previously illustrated as 100, 200 and 300.

The fundamental clamp comprises a generally U-shaped body section 501, 502 and 503 having a threaded hole 504 and a threaded hole 506 as shown. A set screw or other device of the nature illustrated at various points in this application 505 can be inserted into the threaded hole 504. The bolt 507 having head 508 will be threaded through nut 509 and into hole 506, protruding slightly above that hole. It will then enter into nut 510 and against set screw 511, also inserted in nut 510. In this manner the bolt 507 is prevented from turning with relation to nut 510 and may be utilized to exert pressure between the arms 503 and 502 of clamp 501. When the appropriate position has been reached, the entire system may be locked against further rotation by use of the nut 509.

FIG. 11 shows the unusual type clamp 400 illustrated in place in FIG. 8. This clamp is noted to consist of a first member 401 having an extending arm 404 and a second extending arm 405, extending a shorter distance than arm 404, and a second member 402 having a portion 406 with an arm 407. These two members 401 and 402 are welded or otherwise fastened together at 403 and at an angular relationship to one another as indicated. The arm 407 has a threaded hole 408 suitable to accommodate a set screw or the like 409 which will be utilized for pressure against some protruding portion of a manifold as indicated generally in FIG. 8. The portion 405 of element 401 will press against the manifold or the like to provide stability.

The arm 404 will be provided with a suitable threaded hole 413 or the like to accommodate bolt 410 which is manipulated by its head 411. Bolt 410 will normally pass through locking nut 412 which will ultimately be fastened against the lower portion of arm 404. The end of bolt 410, after passing through threaded hole 415, will pass into threads in nut 414 and will set against set screw 415 to prevent rotation when it is tightened against a member such as the flange 60 illustrated in FIG. 8. Thus, pressure will be exerted in an offset manner between the two offset portions of the clamp and their end members.

FIG. 12 illustrates how a clamp of a structure similar to the generally illustrated clamp 500 can be utilized where a flange may have broken at some point adjacent a bolt hole or the like. In this case the clamp 600 has a set screw 601 which has entered the old bolt hole of manifold flange 621. The exhaust flange 631 has been broken at 633 adjacent the old bolt hole. The bolt 602 with its end connection at 603 has been placed against the broken edge and is fully capable of clamping and holding the two parts in position under normal use with no further problem.

FIG. 13 illustrates a change which may be applied to any clamp of the general nature of clamp 500. In this case, the portion 701 joining the arms 702 and 703 is seen to be divided and consisting of two parts 701a and 701b. Each of these parts has a threaded hole 702 and 703 respectively with threaded portions 752 and 753 of element 750 appropriately inserted therein. One of the elements will be provided with right hand threads and the other with left hand threads so that when the element 750 is turned by its appropriate gripping portion 751 it will either lengthen or shorten the overall portion 701 comprised of the two portions 701a and 701b. Thus a clamp of this nature may be provided which has widely adjustable length potential.

Figure 14:
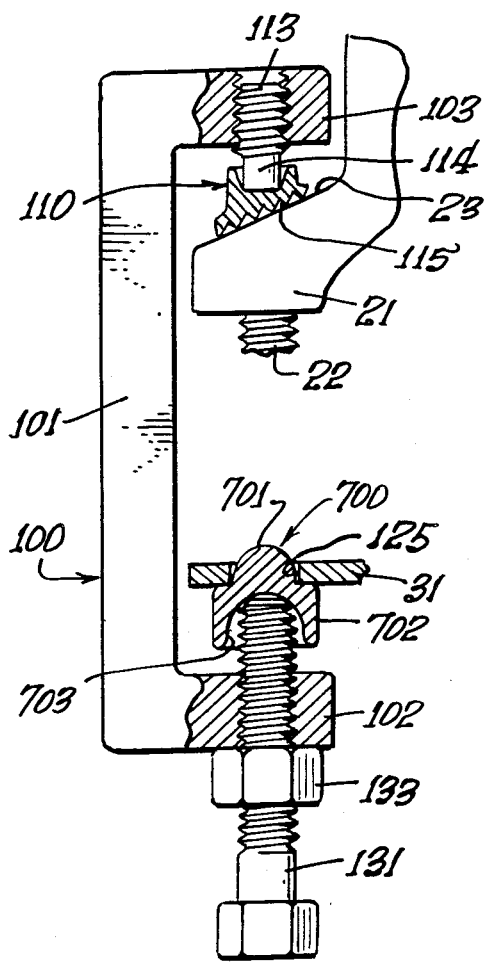
FIG. 14 is an enlarged partially sectioned, partially broken away view of a clamp and a clamping element suitable to be used in the practice of this invention.

FIG. 14 has previously been mentioned as being a description in detail of clamp 100 originally discussed in connection with FIG. 3. It will be noted that clamp 100 consists of a main body portion 101 with two arms 102 and 103 having threaded holes in each of said arms 102 and 103. A special screw 113 having a boss 114, has been inserted in the hole in arm 103 and a special end member 110 having an opening to accommodate the unthreaded portion 114 of screw 113 has been inserted therein and presses against the serrated and inclined lower deck 115 of the element 110. This presses against the inclined surface 23 of manifold flange 21. The bolt 131 inserted through threaded hole in arm 102 by means of head 132 and incorporating locking nut 133 presses into the opening in floating pad element 700 which protrudes into the old bolt hole or the like 125 of exhaust system flange 31.

Figure 16:
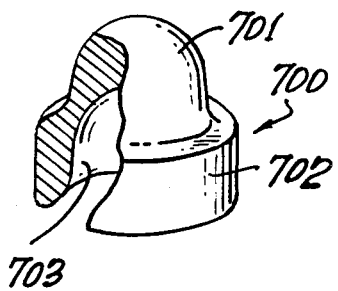
FIG. 16 is an enlarged, partially broken away, partially sectioned, perspective of an element utilized in the illustration of FIG. 14.

Thus, pressure applied at this point and against the sloping deck 23 will achieve the object of holding these portions together. The structure of the floating cap 700 is more particularly described and shown in FIG. 16. It will be seen that this cap may have a rounded dome 701, an enlarged area 702 to apply pressure against the edges of a bolt hole or the like, and an opening 703 which will accommodate the end of a bolt or the like to apply the pressure.

Figure 15:
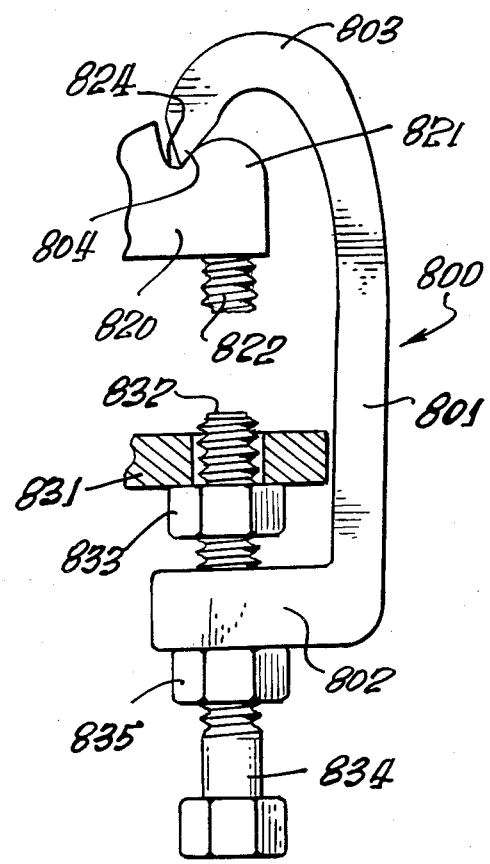
FIG. 15 is a partailly broken away, partially sectioned, elevational view of another specially designed clamp to be used in practicing the method of this invention.

FIG. 15 illustrates particularly an exceptional and interesting unusual clamp to be used in the method of this invention, which clamp generally 800 comprises a principal member 801 with an arm 802 having a hole (not shown) to accommodate bolt 834 in a manner similar to the previous examples of clamp shown. A locking nut 835 will be utilized when the item is completely clamped in place. The bolt 834 will abut against set screw 832 in nut 833 again in the manner similar to those previously described in detail. This in turn will be inserted in appropriate hole or other depression in exhaust system flange 831 as indicated.

The manifold 820, frequently will have protrusions as at 821 with depressions as at 824 in the manifold casting. In this case the pointed end 804 on arm 803 will be able to reach over a protrusion such as 821 and create an excellent connecting pressure through the arm 801 in this type clamp.

Figure 17:
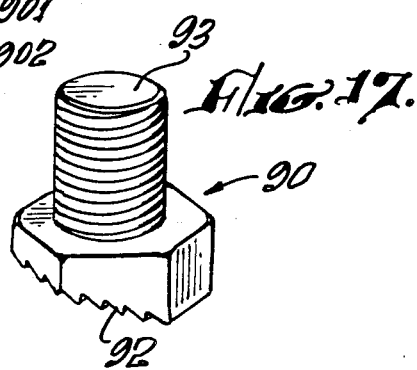
FIG. 17 is an enlarged perspective of a clamping element suitable to be used in the practice of this invention.

FIG. 17 is illustrative of a type clamp attachment which may be used in most of the clamps illustrated for the special purpose of adapting to inclined areas and gripping such areas where no holes or other particular gripping points may exist. The item generally 90 consists of an enlarged head which may be rectangular, hexagonal, or round, or virtually any other shape having an inclined and serrated lower deck 92 with a threaded or unthreaded stem 93 which can be utilized in conjunction with these clamps in the areas previously indicated such as at an area similar to that shown in FIG. 14 with a somewhat different but similar attachment at 110. Variations of such an item may be made so long as a properly serrated and gripping edge is provided.

Figure 18:
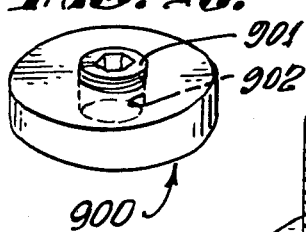
FIG. 18 is a perspective of another alternate element to be used with clamps in the practice of this invention.

FIG. 18 illustrates a round member 900 which has a threaded hole 902 and which will accommodate a set screw 901 to accomplish the purposes shown by any of the nuts illustrated in the various embodiments of clamp suitable to practice the method of this invention. The utilization of such a specimen as that illustrated in FIG. 18 will be particularly advantageous where there may be large broken portions or the like or large broken out holes which need to be, in some manner, accommodated by an unusual pressure element.

While the embodiments of this invention, particularly shown and described, are fully capable of achieving the objects and advantages desired, it is to be understood that such embodiments have been shown for purposes of illustration only and not for purposes of limitation.

I claim:

1. Apparatus to connect two cooperable joinder portions of an exhaust system comprising: a multiplicity of clamping member means, each suitable to grip and hold a different portion of different cooperatively connectable conduit connection elements together in a mating relationship such that the conduit between the two is unobstructed, and in which at least one of said means is connectable to a clamp-like device in such manner that it will adjust to irregularities on the surface of the conduit portion to which it is applied, and wherein at least one member of one of the clamping means has a gripping portion permanently affixed thereto, and wherein one of the clamping means consists of a generally U-shaped frame comprising two parallel and spaced apart legs connected to a web; a first threaded hole through a first leg; a first threaded elongated element having a pointed and hardened end threaded into said first leg in such manner that the pointed end protrudes from the said first leg in the direction of a second leg; a second threaded hole extending through said second leg in axial alignment with said first threaded hole; a second elongated threaded member threadedly mounted within said second threaded hole and extending therethrough in the direction of said pointed threaded element; a locking element threadedly mounted upon said second elongated threaded element in such manner to enable movement of said second threaded elongated element to be prevented by locking connection with second leg; a hollow generally dome shaped member having one end open resting at its open end upon the end of said second elongated threaded member, wherein said dome shaped element is smaller in diameter at its closed end on the exterior thereof than its interior where it is resting upon said second elongated threaded member; means attached to second elongated member to enable it to be moved by turning in the threads of the said second leg and additionally there is a clamping device comprising offset gripping elements which grip two different portions of elements to be clamped together at two positions which are not in axial alignment with one another and in which the two elements are each portions of an automotive exhaust system.

* * * * *